(12) United States Patent
Aboukeila et al.

(10) Patent No.: US 12,630,710 B1
(45) Date of Patent: **\*May 19, 2026**

(54) 1,5-PENTANEDIOL-BASED POLYESTER COMPOSITIONS WITH ENHANCED CRYSTALLIZATION RATES AND METHODS OF MANUFACTURE

(71) Applicant: THE BOARD OF REGENTS OF THE UNIVERSITY OF OKLAHOMA, Norman, OK (US)

(72) Inventors: Hesham Aboukeila, Norman, OK (US); Brian P. Grady, Norman, OK (US); John Klier, Norman, OK (US)

(73) Assignee: THE BOARD OF REGENTS OF THE UNIVERSITY OF OKLAHOMA, Norman, OK (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/250,620

(22) Filed: Jun. 26, 2025

(51) Int. Cl.
| | |
|---|---|
| C08G 63/02 | (2006.01) |
| C08J 3/20 | (2006.01) |
| C08J 5/18 | (2006.01) |
| C08K 3/01 | (2018.01) |
| C08L 67/00 | (2006.01) |
| C08L 67/02 | (2006.01) |

(52) U.S. Cl.
CPC .............. C08L 67/02 (2013.01); C08J 3/201 (2013.01); C08J 5/18 (2013.01); C08K 3/01 (2018.01); C08J 2367/02 (2013.01); C08J 2423/08 (2013.01); C08L 2203/16 (2013.01); C08L 2205/025 (2013.01); C08L 2205/03 (2013.01); C08L 2205/24 (2013.01)

(58) Field of Classification Search
None
See application file for complete search history.

(56) References Cited

U.S. PATENT DOCUMENTS

| | | | |
|---|---|---|---|
| 3,264,272 A | 8/1966 | Rees | |
| 3,845,163 A | 10/1974 | Murch | |
| 5,198,301 A | 3/1993 | Hager et al. | |
| 6,096,818 A * | 8/2000 | Nakaura | .................. C08K 3/04 |
| | | | 524/495 |
| 8,697,804 B1 | 4/2014 | Talkowski | |

(Continued)

FOREIGN PATENT DOCUMENTS

| | | | |
|---|---|---|---|
| EP | 4349881 A1 * | 4/2024 | ................ C08J 5/18 |
| EP | 4534583 A1 * | 4/2025 | ........... C08L 101/16 |

(Continued)

OTHER PUBLICATIONS

Lu, J. et al., "Biobased 1,5-pentanediol derived aliphatic-aromatic copolyesters: Synthesis and thermo-mechanical properties of poly (pentylene succinate-co-terephthalate)s and poly(pentylene adipate-coterephthalate)s". Polymer Degradation and Stability 2019, 163, 68-75. (Year: 2019).*

(Continued)

*Primary Examiner* — Richard A. Huhn
(74) *Attorney, Agent, or Firm* — pH IP Law

(57) ABSTRACT
A fast crystallizing polymer composition comprising (1) a 1,5-pentanediol-based polyester material comprising at least one aliphatic acid and/or aromatic diacid, and (2) a nucleating agent, such as a poly(ethylene-co-methacrylic acid) ionomer and/or a poly(ethylene-co-acrylic acid) ionomer, and a method of making such wherein the polymer composition crystallizes within a period of about 30 seconds or less.

24 Claims, 2 Drawing Sheets

(56)                        References Cited

U.S. PATENT DOCUMENTS

| 10,183,904 | B2 | 1/2019 | Huber et al. |
| 2004/0043221 | A1 | 3/2004 | Bharti et al. |
| 2023/0124025 | A1 | 4/2023 | Klier et al. |

FOREIGN PATENT DOCUMENTS

| WO | WO 2016/101895 | A1 | | 6/2016 | |
| WO | WO-2023173791 | A1 | * | 9/2023 | ................ C08J 5/18 |
| WO | WO-2023228923 | A1 | * | 11/2023 | ............ C08L 101/16 |

OTHER PUBLICATIONS

International Search Report and Written Opinion issued in International Patent Application No. PCT/US2025/015670, mailed Apr. 16, 2025.

Aboukeila, H., et al., "Synthesis and characterization of biobased copolyesters based on pentanediol: (2) Poly(pentylene adipate-co-terephthalate)," *Polymer Engineering & Science*, 64.10 (2024): 4746-4759.

Lu, J. et al., "Biobased 1,5-pentanediol derived aliphatic-aromatic copolyesters: Synthesis and thermo-mechanical properties of poly(pentylene succinate-co-terephthalate)s and poly(pentylene adipate-co-terephthalate)s," *Polymer Degradation and Stability*, 163 (2019): 68-75.

Zheng, L. et al., "Biodegradable High-Molecular-Weight Poly(pentylene adipate- co - terephthalate): Synthesis, Thermo-Mechanical Properties, Microstructures, and Biodegradation," *ACS Sustainable Chemistry & Engineering*, 11.38 (2023): 13885-13895.

* cited by examiner

1,5-PENTANEDIOL-BASED POLYESTER COMPOSITIONS WITH ENHANCED CRYSTALLIZATION RATES AND METHODS OF MANUFACTURE

STATEMENT REGARDING FEDERALLY SPONSORED RESEARCH AND DEVELOPMENT

This invention was made with government support under Grant No. DE-EE0009305 awarded by the Department of Energy. The government has certain rights in the invention.

CROSS-REFERENCE TO RELATED APPLICATIONS

The present application is a continuation of U.S. patent application Ser. No. 19/143,496, entitled "1,5-PEN-TANEDIOL-BASED POLYESTER COMPOSITIONS WITH ENHANCED CRYSTALLIZATION RATES AND METHODS OF MANUFACTURE," filed Jun. 26, 2025, which is a U.S. National Phase Application under 35 U.S.C § 371 of International Patent Application No. PCT/US2025/015670, entitled "1,5-PENTANEDIOL-BASED POLYES-TER COMPOSITIONS WITH ENHANCED CRYSTALLI-ZATION RATES AND METHODS OF MANUFACTURE," filed Feb. 13, 2025, which claims the priority benefit of U.S. provisional application Ser. No. 63/554,363, filed Feb. 16, 2024, and of U.S. provisional application Ser. No. 63/662,306, filed Jun. 20, 2024, the entire contents of each of which are incorporated herein by reference.

BACKGROUND

Polybutylene adipate terephthalate (PBAT) has emerged as a biodegradable polyester alternative to linear low-density polyethylene (LLDPE) and low-density polyethylene (LDPE) for packaging and film applications due to its similar glass and melting temperatures, and the fact that this material can be made into a film using standard blown film technology. However, the low Young's modulus for PBAT requires that more material be used compared to LLDPE. Poly(pentylene adipate-co-terephthalate) (PPeAT) has simi-lar thermal properties and compression molded films have a Young's modulus which is about twice that of PBAT, which means that about half the PPeAT material would be required. However, crystallization of PPeAT requires tens of minutes, which is unacceptably slow for blown films.

PPeAT is a biodegradable, biobased polymer that can be used in place of polyethylene in certain applications. PPeATs of various various Adipic acid/Terephthalic acid A/T ratios have been synthesized and characterized (Lu, J., et al., Biobased 1,5-pentanediol derived aliphatic-aromatic copo-lyesters: Synthesis and thermo-mechanical properties of poly(pentylene succinate-co-terephthalate) s and poly(pen-tylene adipate-co-terephthalate) s. Polymer Degradation and Stability, 2019. 163: p. 68-75.). PPeATs having terephthalic acid concentrations less than 60 mole % had low melting temperatures, poor mechanical properties compared with film grade linear low-density polyethylene, and very slow crystallization rates. PPeATs having terephthalic acid con-centrations in the range of 60-75 mole % had poor mechani-cal properties compared with film grade linear low-density polyethylene. PPeATs having terephthalic acid concentra-tion greater than 75 mole % had glass transition temperatures that were too high, and the mechanical properties were still poor. Hence, these polymer compositions were not suitable for producing films.

PPeATs with 40 mole % adipic acid and 60 mole % terephthalic acid were also synthesized and characterized (Zheng, L., et al., Biodegradable High-Molecular-Weight Poly(pentylene adipate-co-terephthalate): Synthesis, Thermo-Mechanical Properties, Microstructures, and Bio-degradation. ACS Sustainable Chemistry & Engineering, 2023. 11 (38): p. 13885-13895). However, the PPeAT had a low melting temperature and a low shear viscosity. The PPeAT had low viscosity due to an insufficient number average molecular weight. Further, the PPeAT had poor mechanical properties compared with film grade linear low-density polyethylene and a very slow crystallization rate. Hence, this polymer was also not suitable for film applica-tions. Aboukeila et al. also synthesized and characterized PPeAT with 40% adipic acid and 60% terephthalic acid (Aboukeila, H., et al., Synthesis and characterization of biobased copolyesters based on pentanediol: (2) Poly(pen-tylene adipate-co-terephthalate). Polymer Engineering & Science, 2024. 64 (10): p. 4746-4759). Although the PPeAT exhibited certain promising properties, the extremely slow crystallization rate on the order of hours made it unsuitable for film blowing or film applications.

Increasing the rate of crystallization PPeAT would require a nucleating agent (NA), however, currently, no nucleating agents have been identified for nucleating crystallinity in pentanediol-based polyesters.

Traditionally, there have been two classes of NAs for polyesters. The first class is particulates, such as talc, which is used for polyesters such as polylactic acid, polybutylene adipate terephthalate, polyethylene terephthalate, and poly-butylene succinate. Also, silica is used for polyesters such as polylactic acid, polyethylene terephthalate, and polybuty-lene succinate, while halloysite is used for polylactic acid and polybutylene adipate terephthalate. Moreover, titanium oxide and mica are used for polylactic acid and polyethylene terephthalate. However, particulate NAs have disadvantages when applied to blown film applications, as they will nega-tively affect the extensional viscosity and they are likely to scatter light (if they are white) or make the film colored (if the particle is colored).

The second class of NAs includes those that are soluble, or, in the case of a polymer, can be very well dispersed in the polyester. Examples include alkali metal salts and carbonate salts used for polyethylene terephthalate. Calcium lactate will nucleate crystallinity in polylactic acid. Ethylene-based, acrylic acid-based, and styrene-based ionomers will nucleate crystallinity in polyethylene terephthalate, poly(ethylene 2,6-naphthalene dicarboxylate) and polylactic acid.

As emphasized above, the main drawback of polyesters formed using 1,5-pentanediol or copolymers of an aliphatic acid with terephthalic acid, is the slow crystallization times, and there are currently no NAs that have been identified for nucleating crystallinity in pentanediol-based polyesters. Without such NAs, the crystallization kinetics are too slow for the material to be used in applications, including films, fibers and foams. Thus, the identification of NAs able to reduce the crystallization half-time of pentanediol-based polyesters from the order of tens of minutes to the order of seconds would be of great benefit and would enable these polyesters to be used as viable biodegradable alternatives to linear low-density polyethylene in a variety of applications.

DETAILED DESCRIPTION

Figure 1:
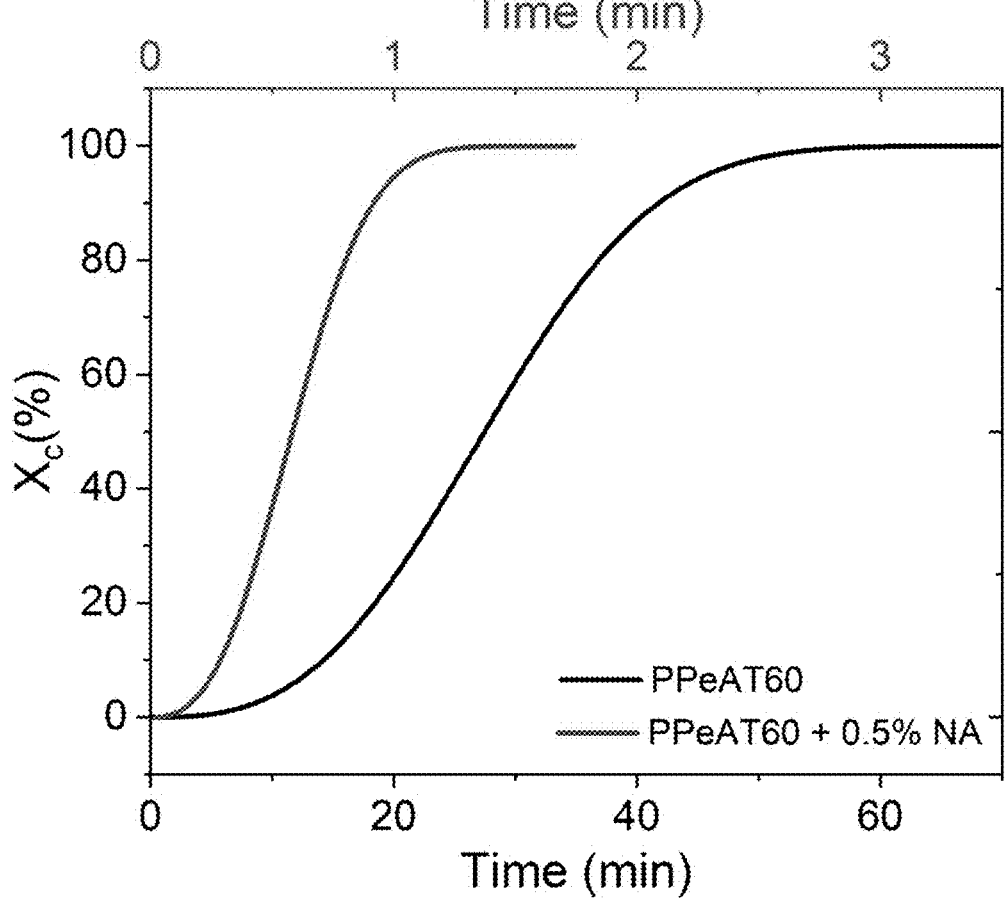
FIG. 1 shows a graph demonstrating isothermal crystal-lization at 40° C. of PPeAT with (left line) and without (right line) an NA. With the NA, the time needed for 50% crystallization to occur ($t_{1/2}$) is only 2.27% of that needed for 50% crystallization without an NA (30 sec vs 28 min).

The present disclosure is directed to compositions of 1,5-pentanediol (PDO)-based polyesters which contain NAs that enable fast crystallization of the PDO-based polyester material, and methods of making such compositions. In non-limiting embodiments, the PDO-based polyester material when combined with the NA for fast crystallization is PPeAT may be used to form blown films and compression molded materials, among other materials.

In at least certain embodiments, the present disclosure is directed to compositions of PDO-based polyesters in which at least one of a poly(ethylene-co-methacrylic acid) ionomer and a poly(ethylene-co-acrylic acid) ionomer is used as an NA. In certain embodiments, the NA may be selected from unneutralized (without cation) poly(ethylene-co-methacrylic acid) and poly(ethylene-co-acrylic acid) ionomers. In certain embodiments, the NA may be sodium-neutralized, zinc-neutralized, lithium-neutralized, or magnesium-neutralized ionomers of poly(ethylene-co-methacrylic acid) or poly(ethylene-co-acrylic acid). Other examples of NAs which may be used to make the presently disclosed PDO-based polyester compositions are described below. In certain non-limiting embodiments, the base PDO-based polyester material comprises at least one aliphatic acid or aliphatic acid salt and at least one aromatic diacid or aromatic diacid salt. For example, the aliphatic acid or salt may be adipic acid or adipate and the aromatic diacid or salt may be terephthalic acid or terephthalate. In a non-limiting embodiment, the PDO-based polyester material which is combined with the NA for fast crystallization is PPeAT. As noted above, the PDO-based polyester materials of the present when combined with the NA for fast crystallization is PPeAT may be used for forming blown films and compression molded materials, among other materials.

Before further describing various embodiments of the present disclosure in more detail by way of exemplary description, examples, and results, it is to be understood that the compounds, compositions, and methods of present disclosure are not limited in application to the details of specific embodiments and examples as set forth in the following description. The description provided herein is intended for purposes of illustration only and is not intended to be construed in a limiting sense. As such, the language used herein is intended to be given the broadest possible scope and meaning, and the embodiments and examples are meant to be exemplary, not exhaustive. Also, it is to be understood that the phraseology and terminology employed herein is for the purpose of description only and should not be regarded as limiting unless otherwise indicated as so. In the description below, numerous specific details are set forth in order to provide a more thorough understanding of the present disclosure. However, it will be apparent to a person having ordinary skill in the art that the present disclosure may be practiced without these specific details. In other instances, features which are well known to persons of ordinary skill in the art have not been described in detail to avoid unnecessary complication of the description. It is intended that all alternatives, substitutions, modifications, and equivalents apparent to those having ordinary skill in the art are included within the scope of the present disclosure. Thus, while the compounds, compositions, and methods of the present disclosure have been described in terms of particular embodiments, it will be apparent to those of skill in the art that variations may be applied to the compounds, compositions, and methods and in the steps or in the sequence of steps of the methods described herein without departing from the concept, spirit, and scope of the inventive concepts.

Each patent, published patent application, and non-patent publication referenced in any portion of this application (including, but not limited to, U.S. Provisional Applications Ser. Nos. 63/554,363, and 63/662,306; U.S. Pat. Nos. 3,264, 272; 3,845,163; 5,198,301; and 10,183,904, and U.S. Published Application No. US2023/0124025) is expressly incorporated herein by reference in its entirety.

The following abbreviations are used herein:

AA: adipic acid,
Ca: calcium,
° C.: degrees Celsius,
D: day,
DSC: Differential scanning calorimeter,
G: gram,
Fe: iron,
K: potassium,
Li: lithium,
m: meter,
MD: machine direction,
Mg: magnesium,
min: minute,
mm: millimeter,
MPa: megapascal,
LDPE: low-density polyethylene,
LLDPE: linear low-density polyethylene,
Na: sodium,
NA(s): nucleating agent(s),
Pa·s: Pascal-second,
PBAT: polybutylene adipate terephthalate,
PDO: 1,5-pentanediol,
PPeAT: Polypentylene adipate-co-terephthalate,
PPeAT60: Polypentylene adipate-co-terephthalate (PDO: AA:TPA 50:20:30 mole %),
sec: second,
TD: transverse direction,
TPA: terephthalic acid, and
Zn: Zinc.

Unless otherwise defined herein, scientific and technical terms used in connection with the present disclosure shall have meanings that are commonly understood by those having ordinary skill in the art.

As utilized in accordance with the methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z. The term "plurality" refers to two or more items.

Unless otherwise required by context, singular terms shall include pluralities and plural terms shall include the singular. Where used herein, the specific term "single" is limited to only "one," and a "pair" means two.

Reference to "a" moiety, chemical, or chemical compound is intended to refer one or more (i.e., a plurality of) atoms or molecules of the substance and is not intended to be limited to a single atom or molecule of the substance unless explicitly indicated as referring to only a single atom or molecule of the substance. Furthermore, the plurality of atoms or molecules may or may not be identical, as long as they possess the same chemical formula or fall under the same category of chemical compound. For example, the plurality of atoms or molecules may comprise the same or different isotopes, isomers, enantiomers, or sterioisomers, or ratios thereof. Further, reference to a particular chemical class, such as a polymer or polyester, is intended to include one or more polymer or polyester molecules, and when in reference to a plurality of the molecules, the molecules making up the plurality may or may not be identical, and may differ, for example, in terms of different numbers of repeating units or having different molecular weights, as long as the molecules fall within a particular average or range of the repeating units or molecular weights.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

As noted above, any numerical range listed or described herein is intended to include, implicitly or explicitly, any number or sub-range within the range, particularly all integers, including the end points, and is to be considered as having been so stated. For example, "a range from 1.0 to 10.0" is to be read as indicating each possible number, including integers and fractions, along the continuum between and including 1.0 and 10.0, that is, having a minimum value equal to or greater than 1.0 and a maximum value equal to or less than 10.0, such as, for example, 3.25 to 8.65. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. Thus, even if a particular data point within the range is not explicitly identified or specifically referred to, it is to be understood that any data points within the range are to be considered to have been specified, and that the inventor(s) possessed knowledge of the entire range and the points within the range.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error for the composition, the method used to administer the composition, or the variation that exists among the study subjects. As used herein the qualifiers "about" or "approximately" are intended to include not only the exact value, amount, degree, orientation, or other qualified characteristic or value, but are intended to include some slight variations due to measuring error, manufacturing tolerances, observer error, and combinations thereof, for example. The term "about" or "approximately", where used herein when referring to a measurable value such as an amount, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 80% of the time, at least 90% of the time, at least 91% of the time, at least 92% of the time, at least 93% of the time, at least 94% of the time, at least 95% of the time, at least 96% of the time, at least 97% of the time, at least 98% of the time, or at least 99% of the time.

As used herein any reference to "one embodiment" or "an embodiment" means that a particular element, feature, composition, structure, or characteristic described in connection with the embodiment is included in at least one embodiment. The appearances of the phrase "in one embodiment" in various places in the specification are not necessarily all referring to the same embodiment.

Where used herein, the pronoun "we" is intended to refer to all persons involved in a particular aspect of the investigation disclosed herein and as such may include non-inventor laboratory assistants and non-inventor collaborators working under the supervision of the inventor(s).

The term "nucleating agent" or "NA" as used herein, refers to a substance that alters how a polymer (e.g., thermoplastic) material crystallizes in a molten state. NAs provide sites and surfaces on which polymer chains can crystallize, thereby causing crystallization to begin earlier, and increasing the crystallization temperature thus increasing the rate of crystallization.

The term "alkyl" refers to refer to branched or unbranched organic chains comprising 1, 2, 3, 4, 5, 6, 7, 8, 9, or 10 carbon atoms and no double bonds, and particularly those comprising 1 carbon (methyl), 2 carbons (ethyl), and 3 carbons (propyl and isopropyl).

The term "aromatic" refers to an organic substance that contains a benzene ring. The term "aromatic acid" refers to an organic substance that is aromatic and contains a carboxyl functional group (—COOH).

The term "aliphatic" refers to an organic substance that does not contain an aromatic (benzene) ring. The term "aliphatic acid" refers to an aliphatic substance which comprises a carboxyl functional group.

The term "diacid" refers to a dicarboxylic acid, i.e., an acid which comprises two-COOH groups.

The term "wt %" (a.k.a., "wt/wt %" and "% (w/w)") when used in reference to a solute is a measure of the concentration of a solute in a solution in terms of the mass of the solute and the mass of the solvent in which the solute is dissolved. The $solute_{mass}$+the $solvent_{mass}$=the $solution_{mass}$. Wt % is calculated by dividing the $solute_{mass}$ by the $solution_{mass}$, then multiplying the resulting quotient by 100.

The term "mole %" when used in reference to a constituent in a mixture herein refers to the number of moles of the constituent divided by the total number of moles of all constituents in the mixture, then multiplied by 100. For example, "a composition containing 10 mole % of constituent A" means that 10% of the moles in the composition comprise "constituent A." Similarly, "a composition containing 50 mole % of constituent A and 50 mole % of constituent B" means that 50% of the moles in the composition comprise "constituent A" and 50% of the moles in the composition comprise "constituent B." Similarly constituent B may be comprised of subconstituents which total to 100% of the moles of constituent B. For example, subconstituent "i" may comprise 25 mole % of the moles of constituent B and subconstituent "ii" may comprise 75 mole % of the moles of constituent B.

In certain non-limiting embodiments, the PDO-based polyester compositions of the present disclosure comprise an aliphatic acid and/or an aromatic diacid in an amount of 0 mole % to 100 mole % of each acid. In at least certain embodiments, the aliphatic acid is adipic acid and the aromatic diacid is terephthalic acid. In certain non-limiting embodiments, the PDO-based polyester composition of the present disclosure may include any PDO-based polyester.

In the present disclosure, the PDO-based polyester material generally comprises about 50 mole % of PDO with the balance comprising the total acid (aliphatic acid and/or aromatic diacid) component. For example, as noted above, in one embodiment, the aliphatic acid or salt thereof may be adipic acid or adipate and the aromatic diacid or salt thereof may be terephthalic acid or terephthalate. In one embodiment, when the PDO-based polyester material is polypentylene adipate-co-terephthalate and the molar amounts of adipate and terephthalate are equal, the mole percentages of the three constituents PDO, adipate, and terephthalate are 50:25:25. In certain embodiments, the mole percentages of the PDO constituent to the total acid constituents (e.g., adipate+terephthalate) are approximately 50:50, such that there is a slight variation in the molar ratio from exactly 50:50 (e.g., 45:55, 46:54, 47:53, 48:52, 49:51, 49.5:50.5, 51:49; 52:48, 53:47, 54:46, or 55:45).

In certain non-limiting embodiments, the PDO-based polyester (PPeAT) compositions of the present disclosure comprise adipic acid/terephthalic acid in a mole % to mole % range of about 40% adipic acid/60% terephthalic acid to about 25% adipic acid/75% terephthalic acid. For example, in certain non-limiting embodiments, the PDO-based polyester compositions of the present disclosure comprise adipic acid and terephthalic acid in a mole % to mole % ratio of about 40% adipic acid to about 60% terephthalic acid, or a ratio of about 39% adipic acid to about 61% terephthalic acid, or a ratio of about 38% adipic acid to about 62% terephthalic acid, or a ratio of about 37% adipic acid to about 63% terephthalic acid, or a ratio of about 36% adipic acid to about 64% terephthalic acid, or a ratio of about 35% adipic acid to about 65% terephthalic acid, or a ratio of about 34% adipic acid to about 66% terephthalic acid, or a ratio of about 33% adipic acid to about 67% terephthalic acid, or a ratio of about 32% adipic acid to about 68% terephthalic acid, or a ratio of about 31% adipic acid to about 69% terephthalic acid, or a ratio of about 30% adipic acid to about 70% terephthalic acid, or a ratio of about 29% adipic acid to about 71% terephthalic acid, or a ratio of about 28% adipic acid to about 72% terephthalic acid, or a ratio of about 27% adipic acid to about 73% terephthalic acid, or a ratio of about 26% adipic acid to about 74% terephthalic acid, or a ratio of about 25% adipic acid to about 75% terephthalic acid.

In certain embodiments, poly(ethylene-co-methacrylic acid) ionomers or poly(ethylene-co-acrylic acid) ionomers may be used as NAs in the compositions of the present disclosure, and include, for example, copolymers of ethylene and methacrylic acid or acrylic acid that are partially or fully neutralized with metal cations. Examples of metal cations which may be used to neutralize the acids of the presently disclosed NAs include metal cations from Groups 1-12, including but not limited to $Li^+$, $Na^+$, $K^+$, $Ca^{2+}$, $Mg^{2+}$, $Fe^{3+}$, and $Zn^{2+}$, or combinations thereof.

In certain non-limiting embodiments, the degree of neutralization of the methacrylic acid or acrylic acid monomer units of the poly(ethylene-co-methacrylic acid) ionomers or poly(ethylene-co-acrylic acid) ionomers is in a range of from about 0.01 equivalent to about 1 equivalent of metal cation per equivalent of methacrylic acid monomer unit, or in a range of from about 0.1 equivalent to about 0.8 equivalent of metal cation per equivalent of methacrylic acid monomer unit, or in a range of from about 0.1 equivalent to about 0.7 equivalent of metal cation per equivalent of methacrylic acid monomer unit, or in a range of from about 0.1 equivalent to about 0.5 equivalent of metal cation per equivalent of methacrylic acid monomer unit, or in a range of from about 0.1 equivalent to about 0.2 equivalent of metal cation per equivalent of methacrylic acid monomer unit.

Poly(ethylene-co-methacrylic acid) ionomers can be made by methods as described in, for example, U.S. Pat. Nos. 3,264,272, 3,845,163, and 5,198,301, the entire contents of which are hereby incorporated herein by reference. Methods of making 1,5-pentanediol (HO—$(CH_2)_5$—OH) are shown in U.S. Pat. No. 10,183,904.

Examples of poly(ethylene-co-methacrylic acid) ionomers which may be used herein as NAs include, but are not limited to, those marketed under the trade designation "SURLYN" by E. I. du Pont de Nemours & Co. These include, but are not limited to, Magnesium poly(ethyleneco-methacrylic acid) ionomers such as "SURLYN 6320", lithium poly(ethylene-co-methacrylic acid) ionomers such as "SURLYN 7930" and "SURLYN 7940", sodium poly (ethylene-co-methacrylic acid) ionomers such as "SURLYN 1601". "SURLYN 1901". "SURLYN HP-2000", "SURLYN PC-100", "SURLYN 8020", "SURLYN 8120", "SURLYN 8140", "SURLYN 8150", "SURLYN 8320", "SURLYN 8527". "SURLYN 8660", "SURLYN 8920", "SURLYN 8940", and "SURLYN 8945", and zinc poly(ethylene-co-methacrylic acid) ionomers such as "SURLYN 1652", "SURLYN 1705-1", "SURLYN 1706", SURLYN 6101", SURLYN 9020", "SURLYN 9120", "SURLYN 9150", "SURLYN 9320W", "SURLYN 9520", "SURLYN 9650". "SURLYN9720", "SURLYN9721", "SURLYN9910", "SURLYN 9945", "SURLYN 9950", and "SURLYN 9970".

Examples of poly(ethylene-co-acrylic acid) ionomers which may be used herein as NAs include, but are not limited to, those marketed under the trade designation "IOTEK" by ExxonMobil Corp. These include, but are not limited to, lithium poly(ethylene-co-acrylic acid) ionomers, sodium poly(ethylene-co-acrylic acid) ionomers such as "IOTEK 3110", "IOTEK 3800", and "IOTEK 8000", and zinc poly(ethylene-co-acrylic acid) ionomers such as "IOTEK 4200".

Additional useful poly(ethylene-co-methacrylic acid) ionomers and poly(ethylene-co-acrylic acid) ionomers are described in, for example. U.S. Patent Application Publication No. 2004-0043221A1, the entire contents of which is hereby incorporated herein by reference.

In certain non-limiting embodiments, the amount of the methacrylic acid or acrylic acid monomer units of the poly(ethylene-co-methacrylic acid) ionomers or poly(ethylene-co-acrylic acid) ionomers, respectively, is less than 10 mole %. In certain non-limiting embodiments, the degree of neutralization of the methacrylic acid or acrylic acid monomer units in the poly(ethylene-co-methacrylic acid) ionomers or poly(ethylene-co-acrylic acid) ionomers is from about 20% to about 80%, by the various metal cations disclosed herein, including but not limited to $Zn^{2+}$, $Na^+$, $Li^+$, and $Mg^{2+}$.

In certain non-limiting embodiments, the methacrylic acid and/or acrylic acid monomer unit content (i.e., the free acid form) of the poly(ethylene-co-methacrylic acid) and/or poly(ethylene-co-acrylic acid) ionomer is in a range of from about 1 wt % to about 25 wt %, or from about 2 wt % to about 20 wt %, or from about 3 wt % to about 15 wt %, or from about 5 wt % to about 10 wt %, based on the total weight of the ionomer(s), although lesser or greater amounts may be used.

Other examples of NAs which may be used to make presently disclosed compositions include but are not limited to dialkyl sulfoisophthalates (e.g., sodium dimethyl 5-sulfoisophthalate (SSIPA)), potassium dimethyl 5-sulfoisophthalate (LAK-301), terephthalates (e.g., monosodium terephthalate), dialkyl terephthalates (e.g., dimethyl terephthalates), naphthalene dicarboxylates (e.g., monosodium naphthalene dicarboxylate), isophthalates (e.g., monosodium isophthalate), $N^1$, $N'^6$-dibenzoyladipohydrazide (TMC-306), $N^1$, $N^{1'}$-(ethane-1,2-diyl)bis($N^2$-phenyloxalamide, sulfoisophthalic acids and salts thereof, sulfoterephthalic acids and salts thereof, dialkyl sulfoterephthalic acids and salts thereof, sulfonaphthalene dicarboxylic acids and salts thereof, phenylphosphonic acid, metal salts of phenylphosphonic acid (e.g., zinc phenylphosphonate), p-toluene sulfonate, dodecylbenzenesulfonic acid, and 3-sulfobenzoic acid, in cither acid or salt forms, and combinations of the above. These NAs may be partially or fully neutralized with metal cations. Examples of metal cations which may be used to neutralize the acids of the presently disclosed NAs include metal cations from Groups 1-12, including but not limited to $Li^+$, $Na^+$, $K^+$, $Ca^{2+}$, $Mg^{2+}$, $Fe^{3+}$, and $Zn^{2+}$, or combinations thereof. Optionally, coupling agents such as methylene diphenyl 4,4'-diisocyanate (MDI), maleic anhydride (MA), hexamethylene diamine (HMDA), 2,2'-bis(2-oxazoline) (BOZ), epoxidic multifunctional oligomers (e.g., JONCRYL acrylic resins), and polycarbodiimides (PCDI), glycerol, hexane-1,2,5,6-tetrol (HTCO) or other comonomers may also be mixed with the PPeAT. In non-limiting embodiments, the amount of added coupling agent(s) can be in a range of, for example, 0.1 wt % to 2 wt %.

In at least certain embodiments of the present disclosure, the amount of NA (e.g., ionomers) combined and melt-mixed with the PDO-based polyester material, is in a range from about 0.05 wt % to about 5 wt %, a range from about 0.1 wt % to about 5 wt %, a range from about 0.1 wt % to about 4 wt %, a range from about 0.1 wt % to about 3 wt %, a range of about 0.1 wt % to about 2.5 wt %, a range of about 0.1 wt % to about 1.5 wt %, or a range of about 0.5 wt % to about 2.5 wt % of the weight of the PDO-based polyester material. In more particular exemplary embodiments, the amount of the NA combined with the PDO-based polyester material is about 0.1 wt %, about 0.15 wt %, about 0.2 wt %, about 0.25 wt %, about 0.3 wt %, about 0.35 wt %, about 0.4 wt %, about 0.45 wt %, about 0.5 wt %, about 0.55 wt %, about 0.6 wt %, about 0.65 wt %, about 0.7 wt %, about 0.75 wt %, about 0.8 wt %, about 0.85 wt %, about 0.9 wt %, about 0.95 wt %, about 1.0 wt %, about 1.05 wt %, about 1.1 wt %, about 1.15 wt %, about 1.2 wt %, about 1.25 wt %, about 1.3 wt %, about 1.35 wt %, about 1.4 wt %, about 1.45 wt %, about 1.50 wt %, about 1.55 wt %, about 1.6 wt %, about 1.65 wt %, about 1.7 wt %, about 1.75 wt %, about 1.8 wt %, about 1.85 wt %, about 1.9 wt %, about 1.95 wt %, about 2.0 wt %, about 2.05 wt %, about 2.1 wt %, about 2.15 wt %, about 2.2 wt %, about 2.25 wt %, about 2.3 wt %, about 2.35 wt %, about 2.4 wt %, about 2.45 wt %, about 2.5 wt %, about 2.55 wt %, about 2.6 wt %, or about 2.65 wt %.

In at least one embodiment, the disclosed polymer material can be used to produce biodegradable flexible thin films. In other embodiments, the polymer material can be used in various molding applications such as, but not limited to, flexible foams, tubing, and containers such as bottles. In other embodiments, the polymer material can be used in fibers in place of polyethylene terephthalate.

Certain novel embodiments of the present disclosure, having now been generally described, will be more readily understood by reference to the following examples, which are included merely for purposes of illustration of certain aspects and embodiments of the present disclosure, and are not intended to be limiting. The following examples are to be construed, as noted above, only as illustrative, and not as limiting of the present disclosure in any way whatsoever. Those skilled in the art will promptly recognize appropriate variations from the various compositions, structures, components, procedures, and methods.

EXAMPLES

Example 1

Different weight percentages of NAs, from 0.1 wt % to 5 wt %, were melt-mixed with a PPeAT polyester material. The polyesters tested comprised 50 mole % of PDO and 50 mole % of a mixture of aliphatic and aromatic diacids ranging from 0-100%. The results in this example are for adipic acid+terephthalic acid (40:60 mole %), and 0.5 wt % of an NA. In this example, the NA used was a poly(ethylene-co-methacrylic acid) ionomer commercialized by Dupont under the tradename SURLYN 8527, in which the methacrylic acid groups are partially neutralized by $Na^+$. This amount of NA used resulted in a favorable outcome for the resulting polymeric material, PPeAT, in that more NA did not substantially increase the rate, while less did decrease the rate of crystallization, for this particular ratio of adipic acid+terephthalic acid (40:60 mole %). The mixture was tested for isothermal and non-isothermal crystallization in a DSC (differential scanning calorimeter) to check the effect of the NA on the PPeAT crystallization.

The degree of crystallinity during isothermal crystallization at 40° C. is shown in FIG. 1 as a function of time. The temperature 40° C., was chosen because the crystallization rate is about maximum for the virgin PPeAT at that temperature. The inverse of the crystallization half-time ($t_{1/2}$) is used to determine the crystallization rate, where $t_{1/2}$ is defined as the time needed for 50% crystallization to occur. It can be seen that by adding the NA, the $t_{1/2}$ decreased by about 2 orders of magnitude, from 28 min ($1.68 \times 10^3$ sec) to 30 sec ($3.0 \times 10^1$ sec).

Figure 2:
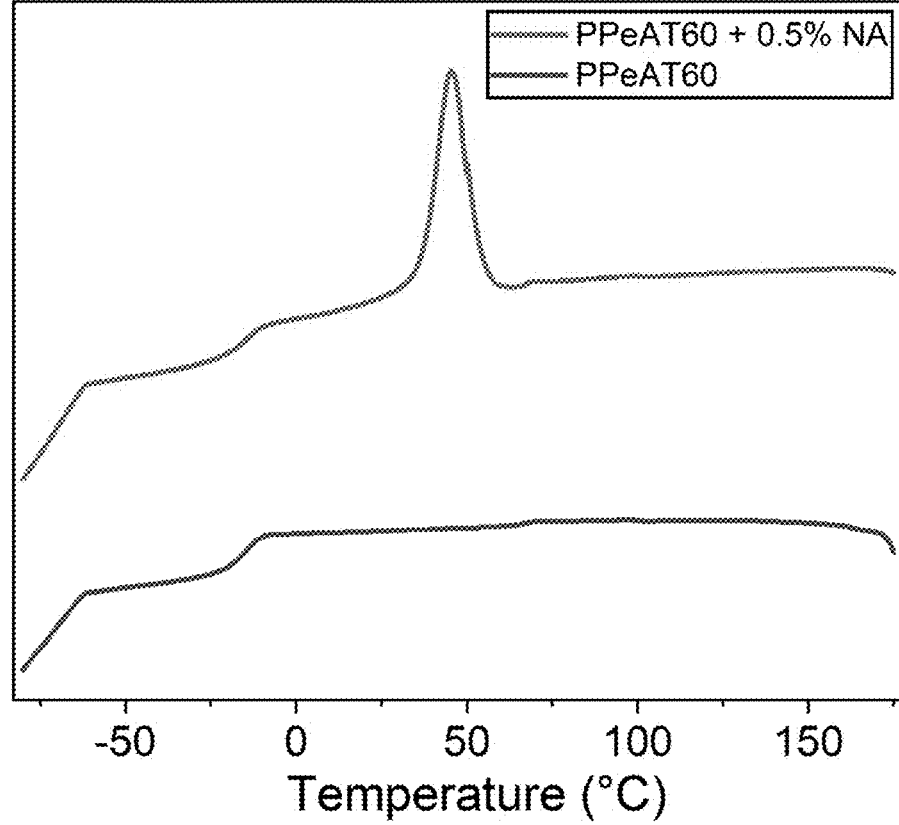
FIG. 2 shows a graph demonstrating non-isothermal crystallization (cooling from 180° C. to −85° C. at 10° C./min) of PPeAT with (rop line) and without (bottom line) an NA. Upon the addition of the NA, a clear crystallization peak appeared at 45° C. indicating a substantial increase in the crystallization rate.

FIG. 2 illustrates the non-isothermal crystallization results obtained by cooling from 180° C. to −85° C. at 10° C./min. PPeAT does not have a crystallization peak due to the very slow crystallization rate. However, upon the addition of the NA, a clear crystallization peak appeared at 45° C. indicating a substantial increase in the crystallization rate. Further, as Table 1 below demonstrates, the mechanical properties of compression molded films were slightly better with nucleation. Note that the tensile properties given for the unnucleated material were after at least 30 days of room temperature storage; the material would be a viscous melt if the properties were measured for hours after cooling off from the melt while the properties for the sample with the NA would be the same after just tens of seconds.

TABLE 1

Tensile mechanical properties of PPeAT of Example 1 with and without an NA

| Samples | E (MPa)[a] | $\delta_y$ (MPa)[b] | $\epsilon_y$ (%)[c] | $\delta_b$ (MPa)[d] | $\epsilon_b$ (%)[e] |
|---|---|---|---|---|---|
| PPeAT | 140 | 10 | 16 | 27 | 780 |
| PPeAT + 0.5% nucleating agent | 150 | 12 | 18 | 29 | 780 |

[a]Young's modulus, [b]yield strength, [c]yield strain, [d]stress at break, and [e]elongation at break.

Example 2

In non-limiting embodiments, the PPeATs of the present disclosure comprise the parameter values shown in Table 2 for the compositions and the parameter values shown in Table 3 for the physical/mechanical properties of the compositions.

TABLE 2

PPeAT composition[1]

| | |
|---|---|
| Composition of Terephthalic acid (TPA) in the acid mixture: | 60 mole % to 75 mole % |
| Composition of Adipic acid (AA) in the acid mixture | 40 mole % to 25 mole % |

TABLE 2-continued

PPeAT composition[1]

| | |
|---|---|
| Number average molecular weight | ≥100,000 g/mol |
| Weight average molecular weight | ≥200,000 g/mol |
| Nucleating agent composition | 0.1 wt % to 2.5 wt % |

[1](~50 mole % PDO) + (~50 mole % (TPA + AA))

TABLE 3

PPeAT properties

| | |
|---|---|
| Melting temperature | ≥100° C. |
| Glass transition temperature | ≤−10° C. |
| Young's Modulus | ≥180 MPa |
| Elongation at break | ≥700% |
| Shear viscosity | 15,000 Pa · s ± 1,000 Pa · s |
| Oxygen Permeability | ≤0.6 Barrer |
| Carbon dioxide Permeability | ≤4.5 Barrer |
| Water vapor transmission rate | ≤2.0 g · mm/m$^2$ · d |

Example 3

In non-limiting embodiments, three PPeAT compositions (Comparative Samples 1-3) were prepared and processed without NAs, and two novel compositions of PPeATs (PPeAT polymer samples 1 and 2) were prepared and processed with NAs. The five samples of samples of PPeAT were analyzed, evaluated, and compared to determine their physical/mechanical properties PPeAT Synthetic Procedure Synthesis of the PPeAT samples 1 and 2 was performed by two-step procedure, esterification followed by polycondensation. TPA, AA and Pentanediol (PDO) were added at a specified TPA/AA molar ratio at a diacids/diol molar ratio 1:1.77 into a 500 ml reactor. The esterification reaction was started by mixing 75 ml of PDO and phosphoric acid-water (0.1 mol % of acid) at 170° C. for 20 mins under $N_2$ atmosphere. Titanium (IV) isopropoxide (TPT) (0.1 mol % of acid) was added and in situ reaction was allowed to carry for next 40 mins with an $N_2$ blanket. Then, 50 ml PDO, TPA and AA were added, and temperature increased to 200° C. at a rate of 5° C./30 min. Esterification reaction was carried out until 90% of the theoretical amount of water was collected. After esterification, temperature increased to 240° C. slowly and polycondensation performed under vacuum (<0.2 mbar) until a Weissenberg effect was observed (see Singh, O., et al., Synthesis and characterization of biobased copolyesters based on pentanediol: (1) Poly(pentylene dodecanoate-co-furandicarboxylate). Polymer Engineering & Science, 2024. 64 (10): p. 4935-4946).

A. Comparative Sample 1

PPeAT Composition:
 PDO: 50 mole %
 TPA: 10 mole %
 AA: 40 mole %
 NA: 0 mole %
 Coupling agent: 0 mole %
Processing Conditions:
 Method of nucleating agent addition: None
Properties of PPeAT Comparative Sample 1
 Melting temperature: Undetectable
 Glass transition temperature: −41° C.
 Half time crystallization at 40° C.: too slow to measure
 (The extremely slow crystallization rate makes it difficult
  to measure the melting temperature).

B. Comparative Sample 2

PPeAT Composition:
 PDO: 50 mole %
 TPA: 30 mole %
 AA: 20 mole %
 NA: 0 mole %
 Coupling agent: 0 mole %
Processing Conditions:
 Method of nucleating agent addition: None
Properties of PPeAT Comparative Sample 2
 Melting temperature: 125° C.
 Glass transition temperature: 4° C.
 Half time crystallization at 40° C.: 12 min.
 (The Glass transition temperature is too high making the
  polymer very brittle).

C. Comparative Sample 3

PPeAT Composition:
 PDO: 50 mole %
 TPA: 30 mole %
 AA: 20 mole %
 NA: 0 mole %
 Coupling agent: 0 mole %
 PPAT molecular weight: Mw: 188,600 g/mol, Mn: 106,
  450 g/mol
Processing Conditions:
 Compression molding
 Method of nucleating agent addition: None
Properties of PPeAT Comparative Sample 3
 Young's modulus: 138 MPa
 Elongation at break: 784%
 Half time crystallization at 40° C.: 27.5 mins
 Shear Viscosity: 15873 Pa·s

D. Novel PPeAT Sample 1

PPeAT Composition:
 PDO: 50 mole %
 TPA: 30 mole %
 AA: 20 mole %
 PPAT molecular weight: Mw: 188,600 g/mol, Mn: 106,
  450 g/mol
 NA: 0.5% Sodium-neutralized ethylene-methacrylic acid
  copolymer ionomer
 Coupling agent: 0 mole %

Processing Conditions:
 Compression molding
 Method of nucleating agent addition: melt mixing (coni-
  cal twin screw)
Properties of Novel PPeAT Sample 1:
 Young's modulus: 148 MPa
 Elongation at break: 780%
 Half time crystallization at 40° C.: 0.57 mins
 Shear Viscosity: 15120 Pa·s

E. Novel PPeAT Sample 2

PPeAT Composition:
 PDO: 50 mole %
 TPA: 30 mole %
 AA: 20 mole %
 PPAT molecular weight: Mw: 219,000 g/mol, Mn: 69,900
  g/mol
 NA: 0.5% Sodium-neutralized ethylene-methacrylic acid
  copolymer ionomer
 Coupling agent: 0 mole %
Processing Conditions:
 Method of nucleating agent addition: extrusion (single
  screw)
Properties of Novel PPeAT Sample 2 after Compression
Molding:
 Young's modulus: 180 MPa
 Elongation at break: 642%
 Half time crystallization at 40° C.: 0.57 mins
 Shear Viscosity: 435048 Pa·s
 Oxygen permeability: 0.25 Barrer
 Carbon dioxide permeability: 2.25 Barrer
 Water vapor transmission rate: 1.44 g·mm/m$^2$·d
Properties of Novel PPeAT Sample 2 after Film Blowing:
 Young's modulus (MD/TD): 132/124 MPa
 Elongation at break (MD/TD): 334/266%
 Shear Viscosity: 435048 Pa·s
 Oxygen permeability: 0.6 Barrer
 Carbon dioxide permeability: 4.31 Barrer
 Water vapor transmission rate: 2.14 g·mm/m$^2$·d
Crystallization Kinetics
 To alter the crystallization kinetics of the PPeAT, an NA
was added to to the PDO-TPA-AA mixture. The crystalli-
zation half-time was decreased thereby improving the crys-
tallization kinetics to the extent that the PPeAT was able to
crystallize rapidly enough to enable the PPeAT to be blown
into a film. The PPeAT and the NA were passed though a
conical twin screw extruder (DSM Xplore 5 micro com-
pounder) at 150° C. for 2 minutes with a mixing rate of 200
RPM, resulting in a drasticaly improved crystallization rate.
When the same PPeAT was simply compression molded at
180° C. for 5 minutes and a compression of 5 metric tons
(without the addition of NA), no improvement in crystalli-
zation kinetics was observed.
 Other particles or polymer materials that can be added to
the PPeAT to further reduce the half time crystallization rate
of the polymer material, e.g., at about 0.5% wt %. A list of
such particles and polymers can be found in Table 4.

TABLE 4

Materials for adding to increase crystallization of PPeAT. Half-time crystallization and
Avrami model parameters of materials used during melt mixing at 60° C.

| MATERIAL | k | n | $t_{1/2}$ | $\Delta t$ |
|---|---|---|---|---|
| PRISTINE PPEAT | $1.9 * 10^{-5}$ | 3.02 | 32.3 | |
| EXTRUDED PPEAT | 0.05 | 2.13 | 3.37 | — |
| UN-NEUTRALIZED ETHYLENE-METHACRYLIC ACID COPOLYMER | 2.90 | 2.59 | 0.58 | −2.80 |
| SODIUM-NEUTRALIZED ETHYLENE-METHACRYLIC ACID COPOLYMER IONOMERS | 2.90 | 2.59 | 0.58 | −2.80 |
| PENTANEDIOL-DIMETHYL CARBONATE | 1.81 | 2.83 | 0.71 | −2.66 |
| POLY(HEXANEDIOL ADIPATE) | 2.10 | 2.43 | 0.63 | −2.74 |
| POLYBUTYLENE SUCCINATE PBS | 0.26 | 2.29 | 1.54 | −1.83 |
| POLYETHYLENE GLYCOL (PEG 10K) | 1.78 | 2.49 | 0.69 | −2.69 |
| PARAFFIN WAX | 0.88 | 2.50 | 0.91 | −2.47 |
| ETHYLENE GLYCOL | 0.94 | 2.72 | 0.90 | −2.48 |
| POLYETHYLENE GLYCOL (PEG 1K) | 1.68 | 2.41 | 0.69 | −2.68 |
| PARAFFIN OIL | 1.72 | 2.39 | 0.68 | −2.69 |
| PURE POLY (PENTAMETHYLENE FURANOATE) (PPEF) | 1.95 | 2.61 | 0.67 | −2.70 |
| GLYCEROL | 1.04 | 2.49 | 0.85 | −2.52 |
| HEXANETRIOL | 0.82 | 2.45 | 0.93 | −2.44 |
| POLY(DODECAMETHYLENE FURANDICARBOXYLATE) (PDDF) | 2.13 | 2.56 | 0.64 | −2.73 |
| LOW MOLECULAR WEIGHT PPEAT60 | 2.38 | 2.56 | 0.62 | −2.76 |
| POLY(TERT-BUTYL ACRYLATE-CO-ACRYLIC ACID) | 2.33 | 2.49 | 0.61 | −2.76 |
| LINEAR-LOW DENSITY POLYETHYLENE (LLDPE) | 0.99 | 2.30 | 0.86 | −2.52 |
| POLY(METHYL METHACRYLATE) (PMMA) | 1.30 | 2.36 | 0.77 | −2.61 |
| POLYLACTIC ACID (PLA) | 1.42 | 2.29 | 0.73 | −2.64 |
| IRGANOX | 2.40 | 2.41 | 0.60 | −2.78 |
| POLYSTYRENE (PS) | 1.97 | 2.47 | 0.65 | −2.72 | k: rate of crystallization, n: Avrami's constant, $t_{1/2}$: half time crystallization, $\Delta t$: difference in half time crystallization between extruded
PPeAT and half time crystallization after adding material Sodium-neutralized ethylene-methacrylic acid copolymer ionomer NA was mixed in with PPeAT at different weight percentages (0.05 wt % to 2.5 wt %) to investigate the effect of different NA concentrations on the crystallization kinetics. Isothermal crystallization kinetics of the PPeATs combined with different amounts of an NA are shown below in Table 5. Of the levels tested, a maximum crystallization rate was obtained at 0.5 wt % of the NA.

TABLE 5

Half–time crystallization of PPeAT when
blended with various wt % of NAs at 40° C.
Avrami model parameters are indicated.

| Nucleating agent (wt %) | $t_{1/2}$ (min) | K (min$^{-n}$) | n |
|---|---|---|---|
| 0.05 wt % | 19 | 0.12 | 2.77 |
| 0.1 wt % | 0.96 | 0.76 | 2.46 |
| 0.3 wt % | 0.73 | 1.50 | 2.45 |
| 0.5 wt % | 0.57 | 3.15 | 2.75 |
| 1.0 wt % | 0.70 | 1.87 | 2.85 |
| 2.5 wt % | 0.79 | 1.36 | 2.72 |

$t_{1/2}$ = half–time crystallization, k = rate of crystallization, n = Avrami's constant Methods
Compression Molding Compression molded sheets with thicknesses between 0.4 and 0.5 mm were produced via a Carver laboratory press operated at 5 metric tons and a temperature of 180° C.
Film Blowing Pellets were fed to a LE8-30/C conical single screw extruder (30/1 L/D ratio) fitted with a LUMF-150 ultra microfilm blowing tower from Labtech engineering. The heating barrel temperature was set to 210° C. while the die heating temperature was set to 200° C. The annular die was 20 mm in diameter and the blow-up ratio (BUR) was set to 3.5. The other parameters were adjusted so as to produce an average bubble thickness of 0.05 mm for all samples. Hence, the screw speed, air blower, haul-off speed and pull roll and winder speed were set to 300 RPM, 1020 RPM, 4.9 ft/min and 29.4 ft/min, respectively for LLDPE and 100 RPM, 2000 RPM, 2 ft/min and 15 ft/min, respectively for the PPeAT and PBAT.
Film Extrusion Cast film extruded films were prepared using a Labtech Engineering company extruder. Extrusion conditions used are shown below in Table 6.
Results of Comparison of Samples A detailed comparison of compression molded samples of LLDPE or LDPE, PBAT, and PPeAT60 is shown in Tables 7 and 8. Comparisons of blown films are shown in Tables 9 and 10. Comparisons of extruded films are shown in Tables 11 and 12. In each table, the mentioned property results are provided alongside the percent of deviation from LLDPE or LDPE. So, for example, The Young's modulus of PBAT is 34% of the Young's modulus of LLDPE while for PPeAT60, the Young's modulus is 78% of the Young's modulus of LLDPE. Additionally, if the percentage exceed 100% it means the value of mentioned property of that polymer is higher than the value of the property of LLDPE as can be observed for the water vapor transmission rates in Table 8. Referring to the results in Tables 7, 9 and 11, the closer the comparison to 100% or higher the better, while for the results in Tables 8, 10, and 12 the lower the percentage the better. The reason is, LLDPE and LDPE have high enough mechanical properties therefore having similar mechanical properties is the desired goal. However, LLDPE and LDPE don't have good barrier properties hence having better barrier properties hence a lower gas permeability and water vapor transmission rate is desired.

From Table 7, it can be seen that PPeAT60 has similar mechanical properties to LLDPE and better mechanical properties than commercial PBAT. From Table 8, PPeAT60 has much better oxygen and carbon dioxide permeability than LLDPE and PBAT. Although PPeAT60 has a much higher water vapor transmission rate than LLDPE, PPeAT60 still has a much lower water vapor transmission rate than commercial PBAT.

For Tables 9 and 10, a similar trend can be observed. For the mechanical properties of the films both the machine direction (MD) and transverse direction (TD) were measured. MD is the direction that a material unwinds as it's being fed into a press, or rollers. TD is the direction that is 90 degrees to the machine direction. For the barrier properties, the orientation of the film (MD or TD) during testing does not affect the results. Hence only one set of results per film is calculated.

For Tables 7-10, pure polymers were tested. For Tables 11 and 12, a polymer mixture was tested. Polylactic acid (PLA) was mixed with PBAT and PLA to improve the mechanical properties aka Young's modulus since PLA have a very high Young's modulus. Percentages used were wt %. The addition of PLA to PPeAT60 scientifically improved the Young's modulus compared to LDPE while maintaining a high elongation at break comparable with the elongation at break for LDPE. The addition of PLA slightly increased the oxygen permeability, carbon dioxide permeability and water vapor transmission rate. However, the extruded PPeAT60 films still exhibited better oxygen and carbon dioxide permeability, and a slightly higher water vapor transmission rate compared to LDPE extruded films.

As it can be seen from the results, the film properties strongly depend on the detailed method of fabrication. Film blowing and film extrusion are the predominant fabrication methods employed in the industry. PPeAT60 films disclosed herein show significantly higher modulus than PBAT films and modulus is much closer to the reference LLDPE values with comparable elongation at break. Additionally, PPeAT60 shows significantly better barrier properties compared to PBAT and LLDPE or LDPE.

In a non-limiting embodiment, the present disclosure is directed to a polymer composition, comprising: (a) a 1,5-pentanediol (PDO) component, (b) an acid component comprising adipic acid (AA) and terephthalic acid (TPA), and (c) a nucleating agent (NA), wherein the AA comprises 25-40 mole % and the TPA comprises 60-75 mole % of the acid component, and the NA is in a range of 0.4 to 0.75 wt % of the polymer composition, and wherein the polymer composition has a melting temperature $\geq 100°$ C., a glass transition temperature$\leq -10°$ C., a Young's Modulus $\geq 180$ MPa, an elongation at break $\geq 700\%$, a shear viscosity of 15,000 Pa·s±1,000 Pa·s, an oxygen permeability$\leq 0.6$ Barrer, a carbon dioxide permeability$\leq 4.5$ Barrer, and a water vapor transmission rate$\leq 2.0$ g·mm/m$^2$·d.

In a non-limiting embodiment, the present disclosure is directed to a polyester blown film comprising (a) a 1,5-pentanediol (PDO) component, (b) an acid component comprising adipic acid (AA) and terephthalic acid (TPA), and (c) a nucleating agent (NA), wherein the AA comprises 25-40 mole % and the TPA comprises 60-75 mole % of the acid component, and wherein the polyester blown film has a Young's modulus-machine direction (MD) in a range of 117-146 MPa, a Young's modulus-transverse direction (TD) in a range of 95-154 MPa, an elongation at break-MD in a range of 316%-350%, an elongation at break-TD in a range of 227% to 303%, a shear viscosity in a range of 410000 to 460000 Pa·s, an oxygen permeability in a range of 0.5 to 0.7 Barrer, a carbon dioxide permeability in a range of 4.0 to 4.6 Barrer, and a water vapor transmission rate in a range of 1.9 to 2.3 g·mm/m$^2$·d.

TABLE 6

Extrusion conditions.

| Parameter | Parameter Value |
| --- | --- |
| Barrel Zone 1 | 350° F. |
| Barrel Zone 2 | 350° F. |
| Barrel Zone 3 | 350° F. |
| Barrel Zone 4 | 350° F. |
| Filter/Clamp | 350° F. |
| Adapter Pipe | 350° F. |
| Feed Block | 350° F. |
| Die Left | 380° F. |
| Die Middle | 380° F. |
| Die Right | 380° F. |
| Screw Speed | 18 rev/min |
| Motor Load | 50% |
| Back Pressure | 50 Bar |
| Melt Temperature | 396° F. |
| Casting Rate | 1.0 m/min |
| Die Width | 250 mm |
| Die Gap | 635 μm |
| Chill Roll Temperature | 100° F. |

TABLE 7

Mechanical properties comparison of compression molded sheets

| Sample | Young's modulus Result MPa | Comparison % | Yield Strength Result MPa | Comparison % | Elongation at break Result % | Comparison % | Percent crystallinity Result % | Comparison % |
| --- | --- | --- | --- | --- | --- | --- | --- | --- |
| LLDPE | 230 | 100% | 20.1 | 100% | 707 | 100% | 41.8 | 100% |
| PBAT | 78 | 34% | 26 | 129% | 815 | 115% | 18.6 | 44% |
| PPeAT 60 | 180 | 78% | 22.5 | 112% | 642 | 91% | 16 | 38% |

TABLE 8

Barrier properties comparison of compression molded sheets

| Sample | Oxygen Permeability Result Barrer | Comparison % | Carbon dioxide Permeability Result Barrer | Comparison % | Water vapor transmission rate Result g · mm/ m$^2$ · day | Comparison % |
| --- | --- | --- | --- | --- | --- | --- |
| LLDPE | 2.65 | 100% | 12 | 100% | 0.099 | 100% |
| PBAT | 1.2 | 45% | 12.6 | 105% | 6.95 | 7020% |
| PPeAT60 | 0.25 | 9% | 2.25 | 19% | 1.44 | 1455% |

TABLE 9

Mechanical properties comparison of blown films.

| Sample | | Young's modulus Result MPa | Comparison % | Yield Strength Result MPa | Comparison % | Elongation at break Result % | Comparison % | Percent crystallinity Result % | Comparison % |
|---|---|---|---|---|---|---|---|---|---|
| LLDPE | MD | 165.5 | 100% | 16.7 | 100% | 673 | 100% | 36.8 | 100% |
| | TD | 165.8 | 100% | 13.5 | 100% | 580 | 100% | 38.2 | 100% |
| PBAT | MD | 43.2 | 26% | 13.9 | 83% | 622 | 92% | 11.7 | 32% |
| | TD | 50.2 | 30% | 8.9 | 66% | 414 | 71% | 14.3 | 37% |
| PPeAT | MD | 131.7 | 80% | 12.2 | 73% | 334 | 50% | 5.9 | 16% |
| 60 | TD | 124.3 | 75% | 9.5 | 70% | 266 | 46% | 14.7 | 38% |

TABLE 10

Barrier properties comparison of blown films

| Sample | Oxygen Permeability Result Barrer | Comparison % | Carbon dioxide Permeability Result Barrer | Comparison % | Water vapor transmission rate Result g·mm/m²·day | Comparison % |
|---|---|---|---|---|---|---|
| LLDPE | 3.56 | 100% | 14.5 | 100% | 0.17 | 100% |
| PBAT | 1.3 | 37% | 14.8 | 102% | 10.86 | 6388% |
| PPeAT60 | 0.6 | 17% | 4.31 | 30% | 2.14 | 1259% |

TABLE 12-continued

Barrier properties comparison of extruded films

| Sample | Oxygen Permeability Result Barrer | Comparison % | Carbon dioxide Permeability Result Barrer | Comparison % | Water vapor transmission rate Result g·mm/m²·day | Comparison % |
|---|---|---|---|---|---|---|
| PBAT/PLA (55/45) * | 0.6 | 36% | 5.3 | 88% | 4.4 | 1467% |
| PBAT/PLA (55/45) # | 0.8 | 48% | 4.6 | 76% | 3.9 | 1300% |

TABLE 11

Mechanical properties comparison of extruded films

| Sample | | Young's modulus Result Mpa | Comparison % | Yield Strength Result Mpa | Comparison % | Elongation at break Result % | Comparison % | Percent crystallinity Result % | Comparison % |
|---|---|---|---|---|---|---|---|---|---|
| LDPE | MD | 112.9 | 100% | 13.3 | 100% | 252 | 100% | 20.74 | 100% |
| | TD | 118.4 | 100% | 10 | 100% | 370 | 100% | 34.8 | 100% |
| PBAT | MD | 86.6 | 77% | 23.5 | 177% | 735.3 | 292% | 21.06 | 102% |
| | TD | 96 | 81% | 25.2 | 252% | 826.4 | 223% | 20.78 | 60% |
| PBAT/PLA (55%/45%)* | MD | 694.8 | 615% | 25.7 | 193% | 319.9 | 127% | 17.77 | 86% |
| | TD | 312.2 | 264% | 13.8 | 138% | 43 | 12% | 19.85 | 57% |
| PBAT/PLA (55%/45%)# | MD | 1147 | 1016% | 31.5 | 237% | 242.2 | 96% | 20.12 | 97% |
| | TD | 671.6 | 567% | 18.4 | 184% | 83.4 | 23% | 22.56 | 65% |
| PPeAT60/ PLA (55%/45%) | MD | 1268.7 | 1124% | 24.5 | 184% | 176.4 | 70% | 3.53 | 17% |
| | TD | 908.6 | 767% | 18.8 | 188% | 19.8 | 5% | 8.34 | 24% |
| PBAT/PLA (90%/10%)* | MD | 253 | 224% | 18.7 | 141% | 492.8 | 196% | 24.34 | 117% |
| | TD | 207.8 | 176% | 14.8 | 148% | 450.5 | 122% | 36.71 | 105% |
| PBAT/PLA (90%/10%)# | MD | 150.9 | 134% | 21 | 158% | 541.3 | 215% | 22.04 | 106% |
| | TD | 134.6 | 114% | 18.9 | 189% | 562.7 | 152% | 22.5 | 65% |
| PPeAT60/ PLA (90%/10%) | MD | 424 | 376% | 18.1 | 136% | 295.2 | 117% | 5.45 | 26% |
| | TD | 426.1 | 360% | 10 | 100% | 90 | 24% | 15.46 | 44% |

*Donates to commercial polymer mixture,
Donates to polymer mixture was compounded during extrusion process.

TABLE 12

Barrier properties comparison of extruded films

| Sample | Oxygen Permeability Result Barrer | Comparison % | Carbon dioxide Permeability Result Barrer | Comparison % | Water vapor transmission rate Result g·mm/m²·day | Comparison % |
|---|---|---|---|---|---|---|
| LDPE | 1.67 | 100% | 6.03 | 100% | 0.3 | 100% |
| PBAT | 1.2 | 72% | 13.9 | 231% | 6.3 | 2100% |

TABLE 12-continued

Barrier properties comparison of extruded films

| Sample | Oxygen Permeability Result Barrer | Comparison % | Carbon dioxide Permeability Result Barrer | Comparison % | Water vapor transmission rate Result g·mm/m²·day | Comparison % |
|---|---|---|---|---|---|---|
| PPeAT60/ PLA (55/45) | 0.4 | 24% | 2.1 | 35% | 2.6 | 867% |

TABLE 12-continued

Barrier properties comparison of extruded films

| Sample | Oxygen Permeability | | Carbon dioxide Permeability | | Water vapor transmission rate | |
|---|---|---|---|---|---|---|
| | Result Barrer | Comparison % | Result Barrer | Comparison % | Result g · mm/ m² · day | Comparison % |
| PBAT/PLA (90/10) * | 0.7 | 42% | 7.4 | 123% | 4.4 | 1467% |
| PBAT/PLA (90/10) # | 1.1 | 66% | 11.5 | 191% | 6 | 2000% |
| PPeAT60/ PLA (90/10) | 0.5 | 30% | 2.8 | 46% | 1.9 | 633% |

\* Donates to commercial polymer mixture,
\# Donates to polymer mixture was compounded during extrusion process.

While the present disclosure has been described herein in connection with certain embodiments so that aspects thereof may be more fully understood and appreciated, it is not intended that the present disclosure be limited to these particular embodiments. On the contrary, it is intended that all alternatives, modifications, and equivalents are included within the scope of the present disclosure as defined herein. Thus the examples described above, which include particular embodiments, will serve to illustrate the practice of the present disclosure, it being understood that the particulars shown are by way of example and for purposes of illustrative discussion of particular embodiments only and are presented in the cause of providing what is believed to be the most useful and readily understood description of procedures as well as of the principles and conceptual aspects of the present disclosure. Changes may be made in the formulation of the various compositions described herein, the methods described herein, or in the steps or the sequence of steps of the methods described herein without departing from the spirit and scope of the present disclosure. Further, while various embodiments of the present disclosure have been described in claims herein below, it is not intended that the present disclosure be limited to these particular claims. Applicant reserves the right to amend, add to, or replace the claims indicated herein below in subsequent patent applications.

In at least certain aspects, the present disclosure is directed to an invention as characterized in the following non-limiting clauses:

Clause 1. A polymer composition, comprising: a 1,5-pentanediol (PDO)-based polyester material comprising at least one aliphatic acid and/or at least one aromatic diacid, and at least one nucleating agent (NA) selected from poly(ethylene-co-methacrylic acid) ionomers and poly(ethylene-co-acrylic acid) ionomers.

Clause 2. The polymer composition of clause 1, wherein the at least one NA is partially or fully neutralized with a metal cation selected from $Zn^{2+}$, $Li^+$, $Na^+$, $K^+$, $Ca^{2+}$, $Mg^{2+}$, and $Fe^{3+}$, and combinations thereof.

Clause 3. The polymer composition of clause 1 or 2, wherein the at least one NA is selected from zinc-neutralized, sodium-neutralized, lithium-neutralized, and magnesium-neutralized ionomers of poly(ethylene-co-methacrylic acid), and zinc-neutralized, sodium-neutralized, lithium-neutralized, and magnesium-neutralized ionomers of poly(ethylene-co-acrylic acid).

Clause 4. The polymer composition of clause 1, wherein the at least one NA is selected from unneutralized ionomers of poly(ethylene-co-methacrylic acid), and unneutralized ionomers of poly(ethylene-co-acrylic acid).

Clause 5. The polymer composition of any one of clauses 1-4, wherein the at least one NA comprises an amount in a range of 0.1 wt % to about 2.5 wt % of the PDO-based polyester material.

Clause 6. The polymer composition of any one of clauses 1-4, wherein the at least one NA comprises an amount in a range of 0.4 wt % to about 0.6 wt % of the PDO-based polyester material.

Clause 7. The polymer composition of any one of clauses 1-6, wherein the PDO-based polyester material comprises a mixture of at least one aliphatic acid and at least one aromatic diacid.

Clause 8. The polymer composition of any one of clauses 1-7, wherein the at least one aliphatic acid is adipic acid.

Clause 9. The polymer composition of any one of clauses 1-8, wherein the at least one aromatic diacid is terephthalic acid.

Clause 10. The polymer composition of clause 7, wherein the at least one aliphatic acid is adipic acid and the at least one aromatic diacid is terephthalic acid.

Clause 11. The polymer composition of any one of clauses 1-10, further comprising a coupling agent.

Clause 12. The polymer composition of clause 11, wherein the coupling agent is selected from the group consisting of methylene diphenyl 4,4'-diisocyanate (MDI), maleic anhydride (MA), hexamethylene diamine (HMDA), 2,2'-bis(2-oxazoline) (BOZ), epoxidic multifunctional oligomers, polycarbodiimides (PCDI), glycerol, and hexane-1,2,5,6-tetrol (HTeO).

Clause 13. A polymer composition, comprising: (a) a 1,5-pentanediol (PDO) component, (b) an acid component comprising adipic acid (AA) and terephthalic acid (TPA), and (c) at least one nucleating agent (NA), wherein the AA comprises 25-40 mole % and the TPA comprises 60-75 mole % of the acid component, and the at least one NA is in a range of 0.4 to 0.75 wt % of the polymer composition, and wherein the polymer composition has a melting temperature $\geq 100°$ C., a glass transition temperature$\leq -10°$ C., a Young's Modulus $\geq 180$ MPa, an elongation at break $\geq 700\%$, a shear viscosity of 15,000 Pa·s+1,000 Pa·s, an oxygen permeability$\leq 0.6$ Barrer, a carbon dioxide permeability$\leq 4.5$ Barrer, and a water vapor transmission rate$\leq 2.0$ g·mm/m²·d.

Clause 14. The polymer composition of clause 13, wherein the at least one NA is selected from partially or fully neutralized ionomers of poly(ethylene-co-methacrylic acid), partially or fully neutralized neutralized ionomers of poly(ethylene-co-acrylic acid), unneutralized ionomers of poly(ethylene-co-methacrylic acid), and unneutralized ionomers of poly(ethylene-co-acrylic acid).

Clause 15. A polyester blown film, comprising (a) a 1,5-pentanediol (PDO) component, (b) an acid component comprising adipic acid (AA) and terephthalic acid (TPA), and (c) a nucleating agent (NA), wherein the AA comprises 25-40 mole % and the TPA comprises 60-75 mole % of the acid component, and wherein the polyester blown film has a Young's modulus-machine direction (MD) in a range of 117-146 MPa, a Young's modulus-transverse direction (TD) in a range of 95-154 MPa, an elongation at break-MD in a range of 316%-350%, an elongation at break-TD in a range of 227% to 303%, a shear viscosity in a range of 410,000 to 460,000 Pa·s, an oxygen permeability in a range of 0.5 to 0.7 Barrer, a carbon dioxide permeability in a range of 4.0 to 4.6 Barrer, and a water vapor transmission rate in a range of 1.9 to 2.3 g·mm/m²·d.

Clause 16. The polyester blown film of clause 15, wherein the at least one NA is selected from partially or fully neutralized ionomers of poly(ethylene-co-methacrylic acid), partially or fully neutralized neutralized ionomers of poly (ethylene-co-acrylic acid), unneutralized ionomers of poly (ethylene-co-methacrylic acid), and unneutralized ionomers of poly(ethylene-co-acrylic acid).

Clause 17. A polymer composition, comprising: a 1,5-pentanediol (PDO)-based polyester comprising adipic acid, terephthalic acid, and at least one nucleating agent (NA).

Clause 18. The polymer composition of clause 17, wherein the at least one NA is partially or fully neutralized with a metal cation selected from $Zn^{2+}$, $Li^+$, Nat, $K^+$, $Ca^{2+}$, $Mg^{2+}$, and $Fe^{3+}$, and combinations thereof.

Clause 19. The polymer composition of clause 17 or 18, wherein the at least one NA is selected from zinc-neutralized, sodium-neutralized, lithium-neutralized, and magnesium-neutralized ionomers of poly(ethylene-co-methacrylic acid), and zinc-neutralized, sodium-neutralized, lithium-neutralized, and magnesium-neutralized ionomers of poly (ethylene-co-acrylic acid).

Clause 20. The polymer composition of clause 17, wherein the at least one NA is selected from unneutralized ionomers of poly(ethylene-co-methacrylic acid), and unneutralized ionomers of poly(ethylene-co-acrylic acid).

Clause 21. The polymer composition of clause 17, wherein the at least one NA is selected from the group consisting of dialkyl sulfoisophthalates, sodium dimethyl 5-sulfoisophthalate (SSIPA)), potassium dimethyl 5-sulfoisophthalate (LAK-301), terephthalates, monosodium terephthalate, dialkyl terephthalates, dimethyl terephthalates, naphthalene dicarboxylates, monosodium naphthalene dicarboxylate, isophthalates, monosodium isophthalate, N'1, N'6-dibenzoyladipohydrazide (TMC-306), $N_1$, $N_1'$-(ethane-1,2-diyl)bis($N_2$-phenyloxalamide, sulfoisophthalic acids and salts thereof, sulfoterephthalic acids and salts thereof, dialkyl sulfoterephthalic acids and salts thereof, sulfonaphthalene dicarboxylic acids and salts thereof, phenylphosphonic acid, metal salts of phenylphosphonic acid, zinc phenylphosphonate, p-toluene sulfonate, dodecylbenzenesulfonic acid, and 3-sulfobenzoic acid, and combinations of the above.

Clause 22. The polymer composition of clause 21, wherein the at least one NA is partially or fully neutralized with a metal cation selected from $Zn^{2+}$, $Li^+$, Nat, $K^+$, $Ca^{2+}$, $Mg^{2+}$, and $Fe^{3+}$, and combinations thereof.

Clause 23. The polymer composition of clause 21, wherein the at least one NA is unneutralized Clause 24. The polymer composition of any one of clauses 17-23, wherein the at least one NA comprises an amount in a range of 0.1 wt % to about 2.5 wt % of the PDO-based polyester material.

Clause 25. The polymer composition of any one of clauses 17-23, wherein the at least one NA comprises an amount in a range of 0.4 wt % to about 0.6 wt % of the PDO-based polyester material.

Clause 26. The polymer composition of any one of clauses 17-25, further comprising a coupling agent.

Clause 27. The polymer composition of clause 26, wherein the coupling agent is selected from the group consisting of methylene diphenyl 4,4'-diisocyanate (MDI), maleic anhydride (MA), hexamethylene diamine (HMDA), 2,2'-bis(2-oxazoline) (BOZ), epoxidic multifunctional oligomers, polycarbodiimides (PCDI), glycerol, and hexane-1,2,5,6-tetrol (HTeO).

Clause 28. A method of enhancing the crystallization rate of a polymer composition, comprising:

(1) providing a 1,5-pentanediol-based polyester material comprising 1,5-pentanediol (PDO), at least one aliphatic acid, and/or at least one aromatic diacid;

(2) heating the PDO-based polyester material to a temperature sufficient to form melted 1,5-pentanediol-based polyester material;

(3) providing at least one nucleating agent (NA) selected from the group consisting of a poly(ethylene-co-methacrylic acid) ionomer and a poly(ethylene-co-acrylic acid) ionomer; and (4) combining the at least one NA with the melted PDO-based polyester material to form a mixture, and wherein the mixture forms a crystallized PDO-based polyester material within a crystallization half-time of about 30 seconds or less.

Clause 29. The method of clause 28, wherein the at least one NA is partially or fully neutralized with a metal cation selected from $Zn^{2+}$, $Li^+$, $Na^+$, $K^+$, $Ca^{2+}$, $Mg^{2+}$, and $Fe^{3+}$, and combinations thereof.

Clause 30. The method of clause 28 or 29, wherein the at least one NA is selected from zinc-neutralized, sodium-neutralized, lithium-neutralized, and magnesium-neutralized ionomers of poly(ethylene-co-methacrylic acid), and zinc-neutralized, sodium-neutralized, lithium-neutralized, and magnesium-neutralized ionomers of poly(ethylene-co-acrylic acid).

Clause 31. The method of clause 28, wherein the at least one NA is selected from unneutralized ionomers of poly (ethylene-co-methacrylic acid), and unneutralized ionomers of poly(ethylene-co-acrylic acid).

Clause 32. The polymer composition of any one of clauses 28-31, wherein the at least one NA comprises an amount in a range of 0.1 wt % to about 2.5 wt % of the PDO-based polyester material.

Clause 33. The polymer composition of any one of clauses 28-31, wherein the at least one NA comprises an amount in a range of 0.4 wt % to about 0.6 wt % of the PDO-based polyester material.

Clause 34. The method of any one of clauses 28-33, further comprising combining a coupling agent with the mixture.

Clause 35. The method of clause 34, wherein the coupling agent is selected from the group consisting of methylene diphenyl 4,4'-diisocyanate (MDI), maleic anhydride (MA), hexamethylene diamine (HMDA), 2,2'-bis(2-oxazoline) (BOZ), epoxidic multifunctional oligomers, polycarbodiimides (PCDI), glycerol, and hexane-1,2,5,6-tetrol (HTeO).

Clause 36. The method of any one of clauses 28-36, wherein the PDO-based polyester material comprises a mixture of at least one aliphatic acid and at least one aromatic diacid.

Clause 37. The method of clause 36, wherein the at least one aliphatic acid and the at least one aromatic diacid make up the PDO-based polyester material in an aliphatic acid mole % to aromatic diacid mole % ratio in a range of about 25 mole %: 75 mole % to about 40 mole %: 60 mole %.

Clause 38. The method of clause 37, wherein the at least one aliphatic acid is adipic acid.

Clause 39. The method of clause 37, wherein the at least one aromatic diacid is terephthalic acid.

Clause 40. The method of any one of clauses 28-37, wherein the at least one aliphatic acid comprises adipic acid and the at least one aromatic diacid comprises terephthalic acid.

Clause 41. A method of enhancing the crystallization rate of a polymer composition, comprising:

(1) providing a 1,5-pentanediol-based polyester material comprising 1,5-pentanediol (PDO), at least one aliphatic acid, and/or at least one aromatic diacid;

(2) heating the PDO-based polyester material to a temperature sufficient to form melted PDO-based polyester material;

(3) providing at least one nucleating agent (NA); and (4) combining the at least one NA with the melted PDO-based polyester material to form a mixture, and wherein the mixture forms a crystallized PDO-based polyester material within a crystallization half-time of about 30 seconds or less.

Clause 42. The method of clause 41, wherein the at least one NA is selected from the group consisting of dialkyl sulfoisophthalates, sodium dimethyl 5-sulfoisophthalate (SSIPA)), potassium dimethyl 5-sulfoisophthalate (LAK-301), terephthalates, monosodium terephthalate, dialkyl terephthalates, dimethyl terephthalates, naphthalene dicarboxylates, monosodium naphthalene dicarboxylate, isophthalates, monosodium isophthalate, N'1, N'6-dibenzoyladipohydrazide (TMC-306), $N^1$, $N^{1'}$-(ethane-1,2-diyl)bis($N^2$-phenyloxalamide, sulfoisophthalic acids and salts thereof, sulfoterephthalic acids and salts thereof, dialkyl sulfoterephthalic acids and salts thereof, sulfonaphthalene dicarboxylic acids and salts thereof, phenylphosphonic acid, metal salts of phenylphosphonic acid, zinc phenylphosphonate, p-toluene sulfonate, dodecylbenzenesulfonic acid, and 3-sulfobenzoic acid, and combinations of the above.

Clause 43. The method of clause 41 or 42, wherein the at least one NA is partially or fully neutralized with a metal cation selected from $Zn^{2+}$, $Li^+$, Nat, $K^+$, $Ca^{2+}$, $Mg^{2+}$, and $Fe^{3+}$, and combinations thereof.

Clause 44. The method of clause 41 or 42, wherein the at least one NA is unneutralized.

Clause 45. The method of any one of clauses 41-44, wherein the at least one NA comprises an amount in a range of 0.1 wt % to about 2.5 wt % of the PDO-based polyester material.

Clause 46. The method of any one of clauses 41-44, wherein the at least one NA comprises an amount in a range of 0.4 wt % to about 0.6 wt % of the PDO-based polyester material.

Clause 47. The method of any one of clauses 41-46, further comprising combining a coupling agent with the mixture.

Clause 48. The method of clause 47, wherein the coupling agent is selected from the group consisting of methylene diphenyl 4,4'-diisocyanate (MDI), maleic anhydride (MA), hexamethylene diamine (HMDA), 2,2'-bis(2-oxazoline) (BOZ), epoxidic multifunctional oligomers, polycarbodiimides (PCDI), glycerol, and hexane-1,2,5,6-tetrol (HTeO).

Clause 49. The method of any one of clauses 41-48, wherein the PDO-based polyester material comprises a mixture of at least one aliphatic acid and at least one aromatic diacid.

Clause 50. The method of clause 49, wherein the at least one aliphatic acid and the at least one aromatic diacid make up the PDO-based polyester material in an aliphatic acid mole % to aromatic diacid mole % ratio in a range of about 25 mole %: 75 mole % to about 40 mole %: 60 mole %.

Clause 51. The method of clause 50, wherein the at least one aliphatic acid is adipic acid.

Clause 52. The method of clause 50, wherein the at least one aromatic diacid is terephthalic acid.

Clause 53. The method of any one of clauses 41-50, wherein the at least one aliphatic acid comprises adipic acid and the at least one aromatic diacid comprises terephthalic acid.

What is claimed is:

1. A method of forming a polymer composition, comprising:

(1) providing a 1,5-pentanediol-based polyester material comprising 1,5-pentanediol (PDO) and a mixture of at least one aliphatic acid and at least one aromatic diacid;

(2) heating the PDO-based polyester material to a temperature sufficient to form melted 1,5-pentanediol-based polyester material;

(3) providing at least one nucleating agent (NA) selected from the group consisting of a poly(ethylene-co-methacrylic acid) ionomer and a poly(ethylene-co-acrylic acid) ionomer; and (4) combining the at least one NA with the melted PDO-based polyester material to form a mixture, and further comprising combining a coupling agent with the mixture, and wherein the mixture forms a crystallized PDO-based polyester material.

2. The method of claim 1, wherein the at least one NA is partially or fully neutralized with a metal cation selected from $Zn^{2+}$, $Li^+$, Nat, $K^+$, $Ca^{2+}$, $Mg^{2+}$, and $Fe^{3+}$, and combinations thereof.

3. The method of claim 1, wherein the at least one NA is selected from zinc-neutralized, sodium-neutralized, lithium-neutralized, and magnesium-neutralized ionomers of poly(ethylene-co-methacrylic acid), and zinc-neutralized, sodium-neutralized, lithium-neutralized, and magnesium-neutralized ionomers of poly(ethylene-co-acrylic acid).

4. The method of claim 1, wherein the at least one NA is selected from unneutralized ionomers of poly(ethylene-co-methacrylic acid), and unneutralized ionomers of poly(ethylene-co-acrylic acid).

5. The method of claim 1, wherein the at least one NA comprises an amount in a range of 0.1 wt % to about 2.5 wt % of the PDO-based polyester material.

6. The method of claim 1, wherein the at least one NA comprises an amount in a range of 0.4 wt % to about 0.6 wt % of the PDO-based polyester material.

7. The method of claim 1, wherein the coupling agent is selected from the group consisting of methylene diphenyl 4,4'-diisocyanate (MDI), maleic anhydride (MA), hexamethylene diamine (HMDA), 2,2'-bis(2-oxazoline) (BOZ), epoxidic multifunctional oligomers, polycarbodiimides (PCDI), glycerol, and hexane-1,2,5,6-tetrol (HTeO).

8. The method of claim 1, wherein the at least one aliphatic acid and the at least one aromatic diacid make up the PDO-based polyester material in an aliphatic acid mole % to aromatic diacid mole % ratio in a range of about 25 mole %: 75 mole % to about 40 mole %: 60 mole %.

9. The method of claim 8, wherein the at least one aliphatic acid is adipic acid.

10. The method of claim 8, wherein the at least one aromatic diacid is terephthalic acid.

11. The method of claim 1, wherein the at least one aliphatic acid comprises adipic acid and the at least one aromatic diacid comprises terephthalic acid.

12. The method of claim 1, wherein the crystallized PDO-based polyester material is a blown film.

13. A method of forming a polymer composition, comprising:

(1) providing a 1,5-pentanediol-based polyester material comprising 1,5-pentanediol (PDO) and a mixture of at least one aliphatic acid and at least one aromatic diacid;

(2) heating the PDO-based polyester material to a temperature sufficient to form melted PDO-based polyester material;

(3) providing at least one nucleating agent (NA); and (4) combining the at least one NA with the melted PDO-based polyester material to form a mixture, and further comprising combining a coupling agent with the mixture, and wherein the mixture forms a crystallized PDO-based polyester material.

14. The method of claim 13, wherein the at least one NA is selected from the group consisting of dialkyl sulfoisophthalates, sodium dimethyl 5-sulfoisophthalate (SSIPA)), potassium dimethyl 5-sulfoisophthalate (LAK-301), terephthalates, monosodium terephthalate, dialkyl terephthalates, dimethyl terephthalates, naphthalene dicarboxylates, monosodium naphthalene dicarboxylate, isophthalates, monosodium isophthalate, $N^{'1}$, $N^{'6}$-dibenzoyladipohydrazide (TMC-306), $N^{1}$, $N^{1'}$-(ethane-1,2-diyl)bis($N_2$-phenyloxalamide, sulfoisophthalic acids and salts thereof, sulfoterephthalic acids and salts thereof, dialkyl sulfoterephthalic acids and salts thereof, sulfonaphthalene dicarboxylic acids and salts thereof, phenylphosphonic acid, metal salts of phenylphosphonic acid, zinc phenylphosphonate, p-toluene sulfonate, dodecylbenzenesulfonic acid, and 3-sulfobenzoic acid, and combinations of the above.

15. The method of claim 13, wherein the at least one NA is partially or fully neutralized with a metal cation selected from $Zn^{2+}$, $Li^+$, Nat, $K^+$, $Ca^{2+}$, $Mg^{2+}$, and $Fe^{3+}$, and combinations thereof.

16. The method of claim 13, wherein the at least one NA is unneutralized.

17. The method of claim 13, wherein the at least one NA comprises an amount in a range of 0.1 wt % to about 2.5 wt % of the PDO-based polyester material.

18. The method of claim 13, wherein the at least one NA comprises an amount in a range of 0.4 wt % to about 0.6 wt % of the PDO-based polyester material.

19. The method of claim 13, wherein the coupling agent is selected from the group consisting of methylene diphenyl 4,4'-diisocyanate (MDI), maleic anhydride (MA), hexamethylene diamine (HMDA), 2,2'-bis(2-oxazoline) (BOZ), epoxidic multifunctional oligomers, polycarbodiimides (PCDI), glycerol, and hexane-1,2,5,6-tetrol (HTeO).

20. The method of claim 13, wherein the at least one aliphatic acid and the at least one aromatic diacid make up the PDO-based polyester material in an aliphatic acid mole % to aromatic diacid mole % ratio in a range of about 25 mole %: 75 mole % to about 40 mole %: 60 mole %.

21. The method of claim 20, wherein the at least one aliphatic acid is adipic acid.

22. The method of claim 20, wherein the at least one aromatic diacid is terephthalic acid.

23. The method of claim 13, wherein the at least one aliphatic acid comprises adipic acid and the at least one aromatic diacid comprises terephthalic acid.

24. The method of claim 13, wherein the crystallized PDO-based polyester material is a blown film.

* * * * *